(12) United States Patent
Kowal (10) Patent No.: US 11,229,934 B2
(45) Date of Patent: Jan. 25, 2022

(54) METHODS OF FORMING FIBER-REINFORCED COMPOSITE PARTS AND FIBER-REINFORCED COMPOSITE PARTS FORMED THEREBY

(71) Applicant: Ford Global Technologies, LLC, Dearborn, MI (US)

(72) Inventor: Stephen Kowal, Allen Park, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 224 days.

(21) Appl. No.: 16/250,156

(22) Filed: Jan. 17, 2019

(65) Prior Publication Data
US 2020/0230674 A1    Jul. 23, 2020

(51) Int. Cl.
*B21C 23/22* (2006.01)
*B21C 23/08* (2006.01)
(Continued)

(52) U.S. Cl.
CPC .............. *B21C 23/08* (2013.01); *B21C 23/22* (2013.01); *B29C 35/02* (2013.01); *B32B 15/08* (2013.01);
(Continued)

(58) Field of Classification Search
CPC ....... B21C 23/08; B21C 23/14; B21C 23/145; B21C 23/22; B21C 23/24; B21C 23/26;
(Continued)

(56) References Cited

U.S. PATENT DOCUMENTS

| | | | | |
|---|---|---|---|---|
| 1,848,083 A | * | 3/1932 | Wetherald | ............... B21C 23/22 29/888.452 |
| 2,263,714 A | * | 11/1941 | Bloomfield | ........... B21C 37/154 29/523 |

(Continued)

FOREIGN PATENT DOCUMENTS

| | | | | |
|---|---|---|---|---|
| DE | 1758080 A1 | * | 4/1972 | ............. B21C 23/22 |
| JP | S58204138 | | 11/1983 | |

(Continued)

OTHER PUBLICATIONS

Translation; JP 61-147917A, Kitamura et al. May 1986.*

(Continued)

*Primary Examiner* — Edward T Tolan
(74) *Attorney, Agent, or Firm* — Burris Law, PLLC (57) ABSTRACT

A method of forming a fiber-reinforced composite part includes forming a composite preform by extruding a hollow metal shape onto a fiber-reinforced preform at an extrusion temperature and cooling the hollow metal shape from the extrusion temperature to a temperature less than the extrusion temperature. Heat from the hollow metal shape cooling from the extrusion temperature is conducted into the fiber-reinforced preform for curing thereof. Also, thermal contraction of the hollow metal shape onto the fiber-reinforced preform applies a consolidation pressure on the fiber-reinforced preform for curing thereof. The fiber-reinforced preform may be a hollow fiber-reinforced preform and a die can be moved through the hollow fiber-reinforced preform such that consolidation pressure is applied thereto by a combination of the thermal contraction of the hollow metal shape onto the hollow fiber-reinforced preform and the die moving through the hollow fiber-reinforced preform.

20 Claims, 4 Drawing Sheets

(51) Int. Cl.
  *B29C 35/02* (2006.01)
  *B32B 15/08* (2006.01)
  *B29K 101/10* (2006.01)
  *B29L 23/00* (2006.01)
  *B32B 1/08* (2006.01)
  *B29K 307/04* (2006.01)

(52) U.S. Cl.
  CPC ...... *B29K 2101/10* (2013.01); *B29K 2307/04* (2013.01); *B29L 2023/22* (2013.01); *B32B 1/08* (2013.01); *B32B 2250/02* (2013.01); *B32B 2262/106* (2013.01)

(58) Field of Classification Search
  CPC ....... B21C 23/28; B21C 23/30; B21C 29/003; B21C 33/004; B21C 37/09; B21C 37/154
  See application file for complete search history.

(56) References Cited

U.S. PATENT DOCUMENTS

| | | | | |
|---|---|---|---|---|
| 3,098,022 | A * | 7/1963 | Karnie | B21C 23/22 228/126 |
| 3,345,732 | A * | 10/1967 | Brower | B21D 26/14 29/419.2 |
| 3,557,403 | A * | 1/1971 | Lemelson | B29C 48/325 425/71 |
| 3,706,216 | A * | 12/1972 | Weingarten | B29C 48/154 72/258 |
| 3,720,557 | A * | 3/1973 | Longoni et al. | H01P 11/002 156/156 |
| 3,874,207 | A * | 4/1975 | Lemelson | B21C 29/006 72/56 |
| 4,093,693 | A * | 6/1978 | Lemelson | B29C 48/09 264/173.16 |
| 4,370,186 | A * | 1/1983 | Blandin | B29C 48/151 156/203 |
| 4,598,856 | A * | 7/1986 | Bilbao-Eguiguren | B21C 23/22 228/131 |
| 4,604,785 | A * | 8/1986 | Eddens | B21C 37/0803 138/151 |
| 5,222,284 | A * | 6/1993 | Maddock | B21C 23/24 156/428 |
| 5,409,559 | A * | 4/1995 | Lajovic | B29C 69/007 156/218 |
| 5,704,537 | A * | 1/1998 | Friedrich | B21C 37/08 228/148 |
| 8,491,744 | B2 * | 7/2013 | Freermann | B21C 23/30 156/244.14 |
| 8,650,737 | B2 * | 2/2014 | Jarvenkyla | B21C 23/30 29/447 |
| 2004/0050443 | A1 * | 3/2004 | Trivelli | B32B 15/08 138/143 |
| 2005/0181228 | A1 | 8/2005 | McCullough et al. | |
| 2013/0288049 | A1 | 10/2013 | Sample et al. | |
| 2017/0136729 | A1 | 5/2017 | Mizo | |

FOREIGN PATENT DOCUMENTS

| | | | | |
|---|---|---|---|---|
| JP | 61-147917 | A * | 5/1986 | ............ B21C 23/22 |
| JP | 61-182889 | A * | 8/1986 | ............ B21C 37/09 |

OTHER PUBLICATIONS

Translation; JP 61-182899 A, Hattori, Aug. 1986.*
Simancik, E. et al., Short carbon fiber-aluminium matrix composite material prepared by extrusion of powder mixtures, Journal de Physique IV Colloque, vol. 03 (C7), pp. C7-1775-C7-1780, 1993.

* cited by examiner

METHODS OF FORMING FIBER-REINFORCED COMPOSITE PARTS AND FIBER-REINFORCED COMPOSITE PARTS FORMED THEREBY

FIELD

The present disclosure relates to fiber-reinforced composite parts, and more particularly to methods and of forming fiber-reinforced composite parts.

BACKGROUND

The statements in this section merely provide background information related to the present disclosure and may not constitute prior art.

The manufacture of fiber-reinforced composite parts typically requires heat and/or pressure to consolidate a fiber containing matrix. Accordingly, methods of manufacturing fiber-reinforced composite parts can be energy intensive processes.

This issue of expending energy during the manufacture of fiber-reinforced composite parts, among other issues related to the manufacture and use of fiber-reinforced composite parts, are addressed by the present disclosure.

SUMMARY

In one form of the present disclosure, a method of forming a fiber-reinforced composite part includes extruding a hollow metal shape onto a fiber-reinforced preform at an extrusion temperature and cooling the hollow metal shape from the extrusion temperature to a temperature less than the extrusion temperature to form a composite preform. As the hollow metal shape cools, heat from the hollow metal shape is conducted into the fiber-reinforced preform for curing thereof. In some aspects of the present disclosure, the fiber-reinforced preform is a solid fiber-reinforced preform. In such aspects, a consolidation pressure for curing the fiber-reinforced preform is applied thereto via thermal contraction of the hollow metal shape onto the fiber-reinforced preform as it cools from the extrusion temperature to the temperature less than the extrusion temperature. In other aspects of the present disclosure, the fiber-reinforced preform is a hollow fiber-reinforced preform. In such aspects, the consolidation pressure is applied to the hollow fiber-reinforced preform at least in part by moving a die through the hollow composite preform. In some aspects of the present disclosure, the die is an expandable mandrel. Also, in some aspects of the present disclosure the die is drawn or pulled through the hollow composite preform. In other aspects the present disclosure the hollow composite preform is extruded over the inner die.

In some aspects of the present disclosure, the hollow fiber-reinforced preform comprises carbon fibers and a polymer matrix. In such aspects, the polymer matrix may be a thermoplastic polymer matrix or a thermosetting polymer matrix. For example, the hollow fiber-reinforced preform may comprise a thermoplastic polymer matrix such as polyethylene (PE), polyethylene terephthalate (PET polybutylene terephthalate (PBT), polycarbonate (PC), acrylonitrile butadiene styrene (ABS), polyamide (PA or nylon), polypropylene (PP), or combinations thereof. In the alternative, the hollow fiber-reinforced preform may comprise a thermosetting polymer matrix such as an epoxy resin, a phenolic resin, a cyanate ester resin, a bismaleimide resin, a benzoxazine resin, a polyimide resin, or combinations thereof. In some aspects of the present disclosure, a barrier layer is positioned between the hollow metal shape and the fiber-reinforced preform.

In another form of the present disclosure, a method of forming a fiber-reinforced composite part includes extruding a hollow metal shape at an extrusion temperature, positioning a hollow fiber-reinforced preform within the hollow metal shape, and applying consolidation pressure and heat to the fiber-reinforced preform. The consolidation pressure and the heat cure the hollow fiber-reinforced preform positioned within the hollow metal shape such that the fiber-reinforced composite part is formed. The consolidation pressure and heat are applied to the hollow fiber-reinforced preform via thermal contraction of and heat from the hollow metal shape, respectively, cooling from the extrusion temperature to a temperature less than the extrusion temperature. In some aspects of the present disclosure, a die is moved through the hollow composite part. In such aspects, thermal contraction of the hollow metal shape and the die moving through the hollow composite preform apply the consolidation pressure to the hollow fiber-reinforced preform such that the hollow fiber-reinforced composite part is formed.

In still another form of the present disclosure, a method of forming a fiber-reinforced composite includes extruding a hollow metal shape onto a fiber-reinforced preform at an extrusion temperature, and cooling the hollow metal shape extruded onto the fiber-reinforced preform from the extrusion temperature to a temperature less than the extrusion temperature. The hollow metal shape thermally contracts onto and provides heat to the fiber-reinforced preform during cooling from the extrusion temperature to the temperature less than the extrusion temperature. That is, thermal contraction of and heat from the cooling hollow metal shape is applied to the fiber-reinforced preform for curing thereof. In some aspects of the present disclosure, the fiber-reinforced preform comprises an inner bore. In such aspects, a die is moved through the inner bore and applies a consolidation pressure to the fiber-reinforced preform within the hollow metal shape.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Figure 1A:
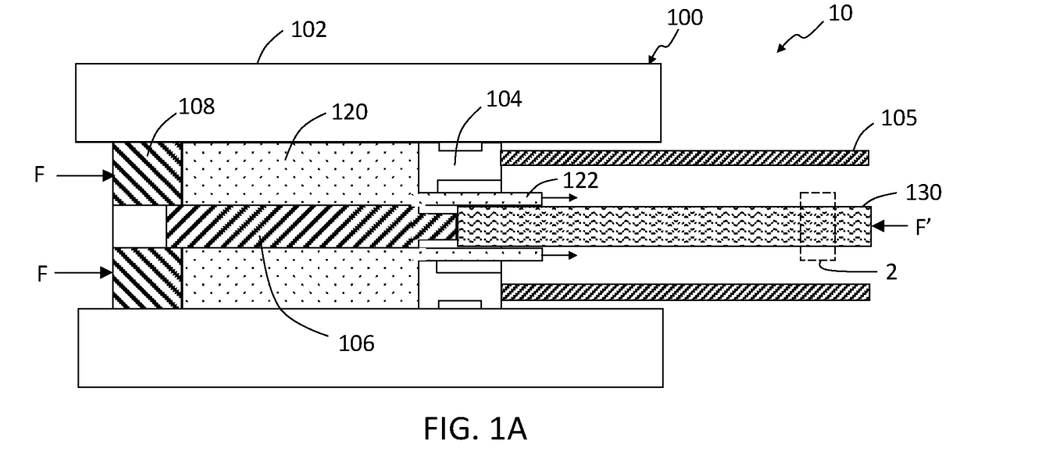
FIG. 1A schematically depicts an extrusion machine extruding a hollow metal shape onto a fiber-reinforced preform according to the teachings of the present disclosure.

Referring now to FIGS. 1A-1D, a method for forming a fiber-reinforced composite part is schematically depicted. The method includes using an extrusion machine 100 at step 10 to extrude a hollow metal shape 122 (as referred to herein as a "tube") as shown in FIG. 1A. The extrusion machine comprises a container 102, a die 104, a die backer 105, a piercing rod 106, a dummy block 108, and a push rod (not shown) at step 10. In some aspects of the present disclosure, a billet 120 is positioned within the container 102 and the piercing rod 106 is translated (+x-direction) through the billet 120 to form an aperture (not labeled) therein. In other aspects of the present disclosure, the billet 120 is pierced (i.e., has an aperture therein) prior to being positioned within the container 102 and the piercing rod 106 is translated (+x-direction) through the aperture after the billet 120 is positioned within the container. After the billet 120 is positioned within the container 102 and the piercing rod 106 is translated through the billet 120, an extrusion force F applied to the dummy block 108 via the push rod (not shown) is transferred to the billet 120 such that the tube 122 is extruded through the die 104 (+x-direction) onto or over a fiber-reinforced preform 130. In some aspects of the present disclosure, the fiber-reinforced preform 130 is rigidly held in position with a counter-force F' while tube 122 is extruded onto the fiber-reinforced preform 130. It should be understood that the billet 120 is heated to an elevated temperature prior to being positioned within the container 102 and the billet 120 is extruded at an extrusion temperature $T_E$ to form the tube 122.

Figure 1B:
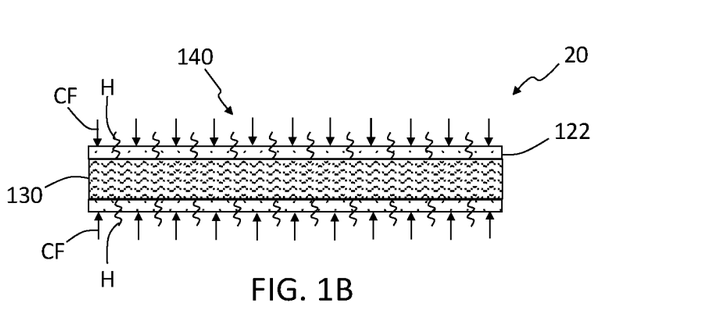
FIG. 1B schematically depicts a hollow metal shape extruded onto a fiber-reinforced preform using the extrusion machine in FIG. 1A according to the teachings of the present disclosure.

Referring now to FIG. 1B, a composite preform 140 formed from the tube 122 extruded over the fiber-reinforced preform 130 at step 10 (FIG. 1A) is at least partially cured within the tube 122 by cooling the tube 122 from the extrusion temperature $T_E$ to a temperature $T_L$ less than the extrusion temperature $T_E$ at step 20. That is, cooling the tube 122 from the extrusion temperature $T_E$ to the temperature $T_L$ releases heat 'H' from the tube 122 and the heat H is conducted from the tube 122 to the fiber-reinforced preform 130. One non-limiting example of the temperature $T_L$ is room temperature (e.g., 23° C.). It should be understood the heat H at least partially cures the fiber-reinforced preform 130. In the alternative, or in addition to, step 20 includes a compressive force 'CF' applied to the fiber-reinforced preform 130 (also referred to herein as a consolidation pressure) via thermal contraction of the extruded tube 122 cooling from the extrusion temperature $T_E$ to the temperature $T_L$. Particularly, for a given coefficient of thermal expansion (COE) of a material from which the billet 120 is formed, a tube 122 with an inner radius of $r_o$, will contract (shrink) around and onto the fiber-reinforced preform 130 by an amount 'Δr' equal to $\alpha \cdot r_o \cdot \Delta T$, where α is the COE of the material and ΔT equals $T_E - T_L$. Also, in some aspects of the present disclosure the fiber-reinforced preform is an incompressible preform and a compressive stress 'σ' equal to $E \cdot \alpha \cdot \Delta T$, where E is the Young's modulus of the material, is applied to the fiber-reinforced preform 130. It should be understood that the compressive force CF at least partially cures the fiber-reinforced preform 130.

Figure 1C:
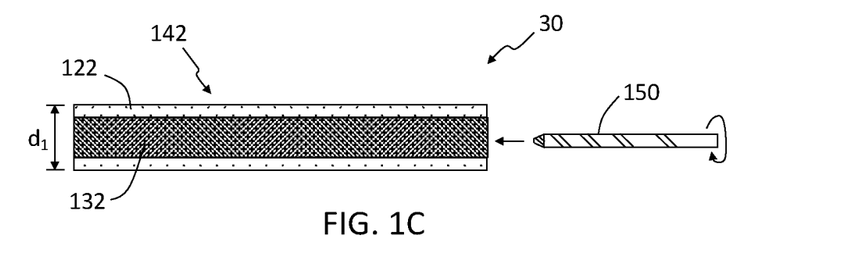
FIG. 1C schematically depicts the hollow metal shape extruded onto the fiber-reinforced preform in FIG. 1B after consolidation of the fiber-reinforced preform such that a fiber-reinforced composite part is formed according to the teachings of the present disclosure.
Figure 1D:
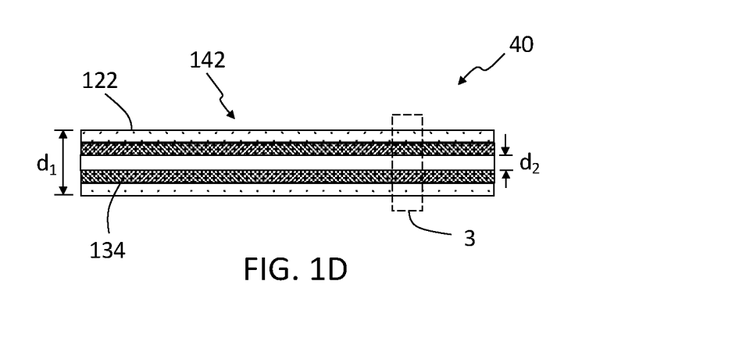
FIG. 1D schematically depicts the fiber-reinforced part in FIG. 1C with an inner aperture according to the teachings of the present disclosure.

At step 30 (FIG. 1C) curing of the fiber-reinforced preform 130 provides a fiber-reinforced composite part 142 with a cured fiber-reinforced core 132. In some aspects of the present disclosure, the fiber-reinforced composite part 142 with an outer diameter '$d_1$' is provided or used as schematically depicted in FIG. 1C, i.e., with a solid fiber-reinforced core 132. In other aspects of the present disclosure, the fiber-reinforced composite part 142 is provided with a cured hollow fiber-reinforced core 134 with an inner diameter '$d_2$' as schematically depicted in FIG. 1D. For example, an aperture 135 may be formed within or through the cured solid fiber-reinforced core 132 using a tool 150 as shown at step 30 and step 40 (FIG. 1D). While the tool 150 is schematically depicted as a drill bit in FIG. 1C, it should be understood that other tools, e.g., a laser, an electric discharge machine (EDM), etc., may be used to form the aperture 135 within the solid fiber-reinforced core 132. In some aspects of the present disclosure, the fiber-reinforced composite part 142 is subjected to one or more additional processing steps, e.g., one or more additional curing steps, one or more machining steps, and the like.

The billet 120 may be formed from metallic materials useful in forming a hollow shape. Non-limiting examples of metallic materials including aluminum, aluminum alloys, copper, copper alloys, steels, stainless steels, nickel, nickel alloys, cobalt, cobalt-base alloys, titanium, titanium-base alloys, and the like. A list of some materials that can be used to form the billet 120 with corresponding COEs, elastic moduli, and extrusion temperature $T_E$ is shown in Table 1 below.

TABLE 1

| Material | COE ($10^{-6}$/° C.) | Elastic Modulus (GPa) | $T_E$ (° C.) |
|---|---|---|---|
| Aluminum Alloys | 21.5-23.8 | 69-73 | 375-500 |
| Copper Alloys | 16.2-20.5 | 97-150 | 600-100 |
| Magnesium Alloys | 25.2-27.0 | 45 | 250-400 |
| Nickel Alloys | 12.8-15.7 | 180-207 | 900-1200 |
| Steels | 11.3-12.3 | 190-200 | 1100-1300 |
| Stainless Steels | 10.2-17.2 | 193 | 1100-1300 |
| Titanium Alloys | 8.6-10.8 | 105-120 | 700-1200 |

The fiber-reinforced preform 130 may be formed from fibers and a polymer matrix useful in form fiber-reinforced parts. Non-limiting examples of fibers include carbon fibers, glass fiber fibers, silica fibers, metallic fibers, Kevlar™ fibers, and the like. In some aspects of the present disclosure, the polymer matrix is a thermoplastic polymer matrix. Non-limiting examples of a thermoplastic polymers include polyethylene (PE), polyethylene terephthalate (PET), polybutylene terephthalate (PBT), polycarbonate (PC), acrylonitrile butadiene styrene (ABS), polyamide (PA or nylon), polypropylene (PP), and combinations thereof. In other aspects of the present disclosure, the polymer matrix is a thermosetting polymer matrix. Non-limiting examples of a thermosetting polymers include epoxy resins, phenolic resins, cyanate ester resins, bismaleimide resins, benzoxazine resins, polyimide resins, and combinations thereof.

Figure 2:
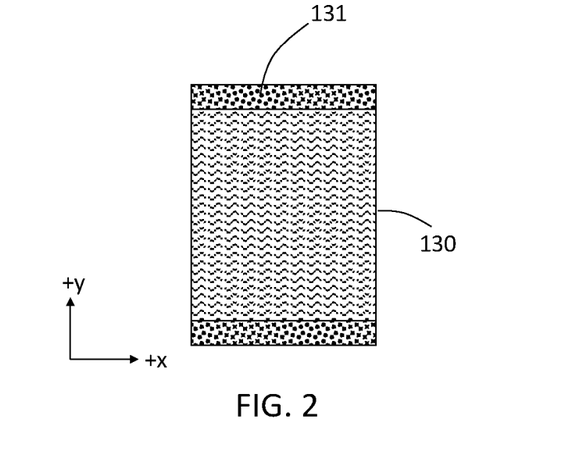
FIG. 2 schematically depicts an enlarged view of section 2 in FIG. 1A according to the teachings of the present disclosure.
Figure 3:
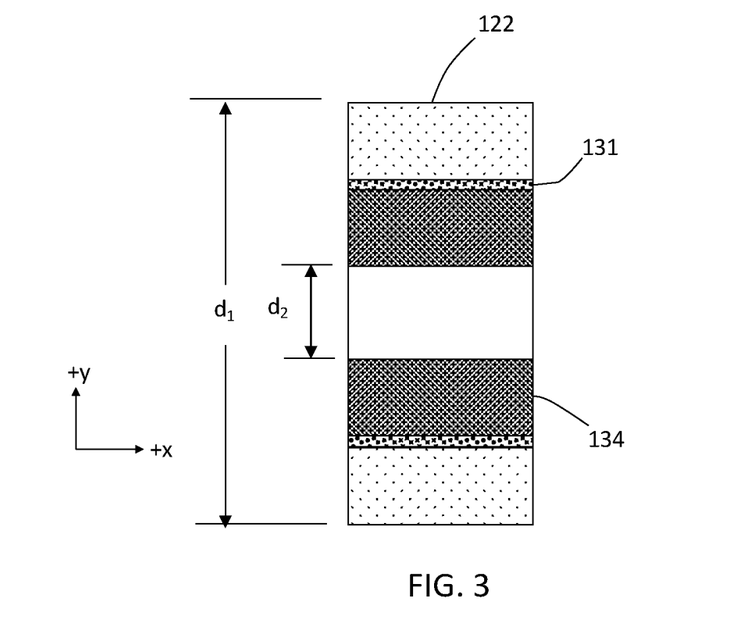
FIG. 3 schematically depicts an enlarged view of section 3 in FIG. 1D according to the teachings of the present disclosure.

In some aspects of the present disclosure, a barrier layer (e.g., a coating) is between the cured fiber-reinforced core 132 and the tube 122 and/or between the hollow fiber-reinforced core 134 and the tube 122. For example, an enlarged view of section '2' in FIG. 1A is shown in FIG. 2 and schematically depicts a coating 131 disposed on the fiber-reinforced preform 130. Also, an enlarged view of section '3' in FIG. 1D is shown in FIG. 3 and schematically depicts the coating 131 disposed between the cured hollow fiber-reinforced core 134 and the tube 122. In some aspects of the present disclosure the coating 131 provides an electrochemical barrier layer between the tube 122 and the fiber-reinforced preform 130. In the alternative, or in addition to, the coating 131 provides lubrication during extrusion of the tube 122 onto the fiber-reinforced preform 130. Non-limiting examples of a material from which the coating 131 is formed include polyvinyl chloride (PVC), silicone rubber, ethylene propylene diene monomer rubber (EPDM), polyether ether ketone (PEEK) thermoplastics, polypropylene (PP), polytetrafluoroethylene (PTFE), polyethylene terephthalate (PET), polysulfones (PES), polyethylenimine (PEI), ethylene chloro trifluoroethylene (ECTFE), polybutylene terephthalate (PBT), graphite, and the like.

Figure 4A:
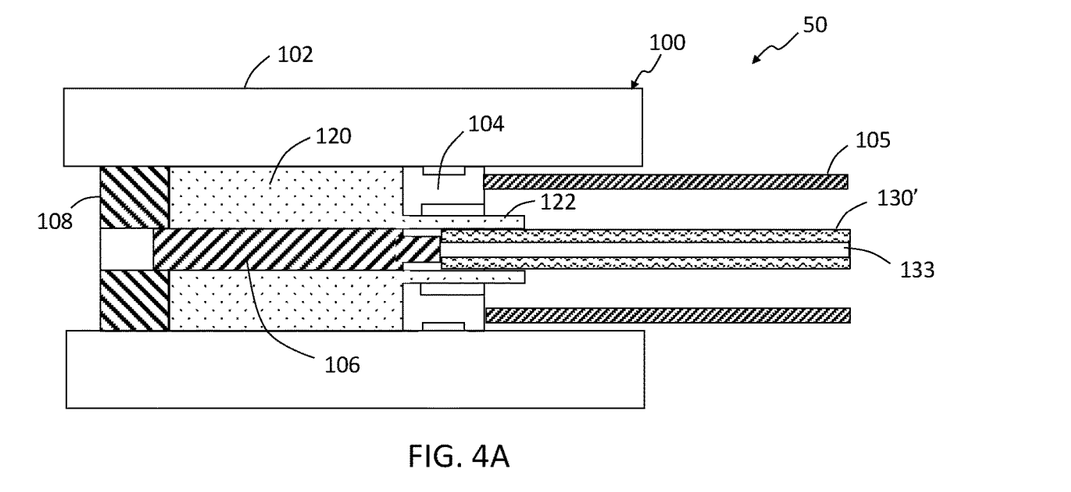
FIG. 4A depicts an extrusion machine extruding a hollow metal shape onto a hollow fiber-reinforced preform according to the teachings of the present disclosure.
Figure 4B:
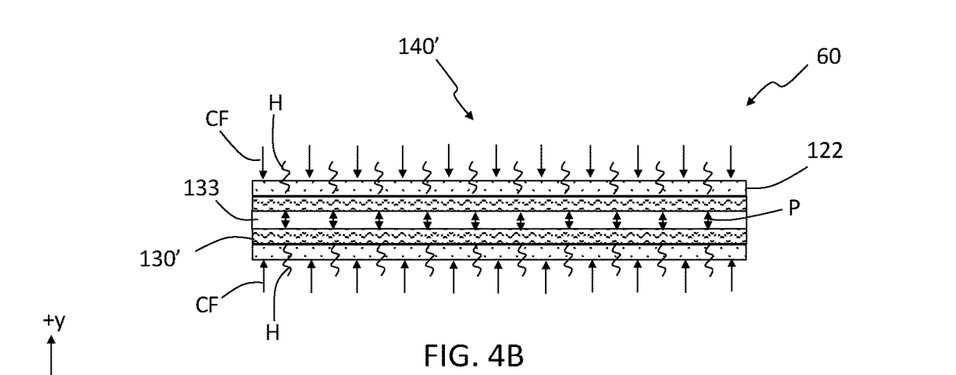
FIG. 4B schematically depicts a hollow metal shape extruded onto a hollow fiber-reinforced preform using the extrusion machine in FIG. 4A according to the teachings of the present disclosure.
Figure 4C:
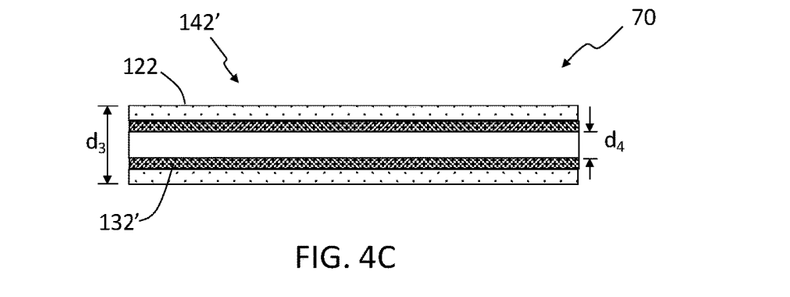
FIG. 4C schematically depicts the hollow metal shape extruded onto the hollow fiber-reinforced preform in FIG. 4B after consolidation of the hollow fiber-reinforced preform such that a fiber-reinforced composite part is formed according to the teachings of the present disclosure.

Referring now to FIGS. 4A-4C, another method for forming a fiber-reinforced composite part using the extrusion machine 100 is schematically depicted. Particularly, the method includes using the extrusion machine 100 to extrude a tube 122 over a hollow fiber-reinforced preform 130' with an inner aperture or bore 133 at step 50 (FIG. 4A). That is, rather than use a solid fiber-reinforced preform 130 as schematically depicted in FIG. 1A, the tube 122 is extruded over and onto the composite hollow fiber-reinforced preform 130' with the inner aperture 133 to provide a composite preform 140' at step 60 (FIG. 4B). The hollow fiber-reinforced preform 130' is at least partially cured within the tube 122 to form a fiber-reinforced composite part 142' at step 70 (FIG. 4C) using the heat 'H' from cooling of the tube 122 from the extrusion temperature $T_E$ to the temperature $T_L$ less than the extrusion temperature $T_E$. In some aspects of the present disclosure, step 60 includes at least partially curing the hollow fiber-reinforced preform 130' using compressive force 'CF' provided by the contraction (shrinking) of the extruded tube 122 when it cools from the extrusion temperature $T_E$ to the temperature $T_L$. In the alternative, or in addition to, step 60 includes at least partially curing the hollow fiber-reinforced preform 130' using a pressure 'P' (outer compressive force) on the inner aperture 133 of the hollow fiber-reinforced preform 130' to provide a fiber-reinforced composite part 142' with an outer diameter '$d_3$' and an inner diameter '$d_4$' at step 70 (FIG. 4C). In still other aspects of the present disclosure, step 60 includes the compressive force 'CF' provided by the thermal contraction (shrinking) of the extruded tube 122 when it cools from the extrusion temperature $T_E$ to the temperature $T_L$ and the outer compressive force 'P' on the inner aperture 133 of the hollow fiber-reinforced preform 130' to at least partially cure the hollow fiber-reinforced preform 130' and provide the fiber-reinforced composite part 142' with the outer diameter $d_3$ and the inner diameter $d_4$ at step 70.

Figure 5:
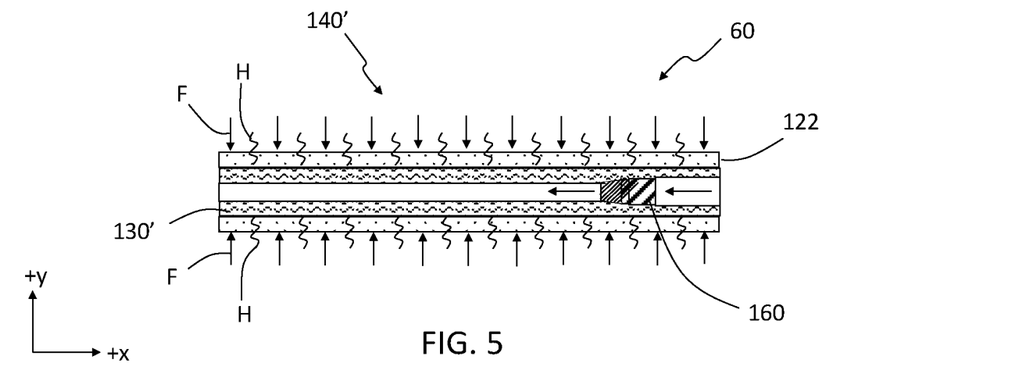
FIG. 5 schematically depicts an inner die moving through the hollow fiber-reinforced preform in FIG. 4B according to the teachings of the present disclosure.
Figure 6:
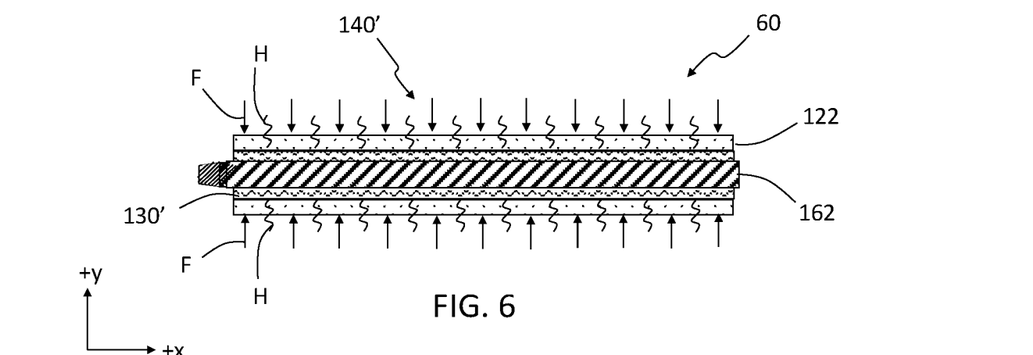
FIG. 6 schematically depicts an inner die moving through the hollow fiber-reinforced preform in FIG. 4B according to the teachings of the present disclosure.

In some aspects of the present disclosure the outer compressive force P is applied within the inner aperture 133 of the hollow fiber-reinforced preform 130' by translating or moving a die 160 (e.g., an inner die) through the hollow fiber-reinforced preform 130' as shown in FIG. 5. In some aspects of the present disclosure, the die 160 is pulled through the hollow fiber-reinforced preform 130'. In other aspects of the present disclosure, the die 160 is pushed through the hollow fiber-reinforced preform 130'. In still other aspects of the present disclosure, the die 160 is held stationary and the hollow-reinforced preform 130' is extruded over the die 160. It should be understood that the die 160 has an outer diameter (not labeled) that is greater than a diameter (not labeled) of the inner aperture 133 such that movement of the die 160 through the hollow fiber-reinforced preform 130' compresses the hollow fiber-reinforced preform 130' thereby assisting in the curing of hollow fiber-reinforced preform 130' to form the cured hollow fiber-reinforced core 132' (FIG. 4C). While FIG. 5 schematically depicts the inner die 160 having a length (x-direction) less than a length of the fiber-reinforced composite preform 130', it should be understood that an inner die 162 (FIG. 6) with a length equal to or greater than the fiber-reinforced composite preform 130' may be used and moved through and compress the hollow fiber-reinforced preform 130', thereby assisting in curing of hollow fiber-reinforced preform 130'. It should also be understood that other methods or techniques can be used to apply the outer compressive force P within the inner aperture 133 of the hollow fiber-reinforced preform 130'. Non-limiting examples of such methods or techniques include the use of pressure balloons or a pressure bladder within the inner aperture 133 of the hollow fiber-reinforced preform 130', placing the fiber-reinforced composite preform 140' within a separate pressure chamber to apply pressurize to the hollow fiber-reinforced preform 130', and the like. In some aspects of the present disclosure, the fiber-reinforced composite part 142' is subjected to one or more additional processing steps, e.g., one or more additional curing steps, one or more machining steps, and the like.

While FIGS. 1A-6 schematically depict the tube 122 being a cylindrical tube with an outer diameter equal to $d_1$ or $d_3$, it should be understood that the tube 122 can have other shapes. Non-limiting examples of other shapes include square tubing (i.e., tubing with a square cross-section in the y-z plane depicted in the figures), hexagonal tubing, rectangular tubing, and the like.

Figure 7:
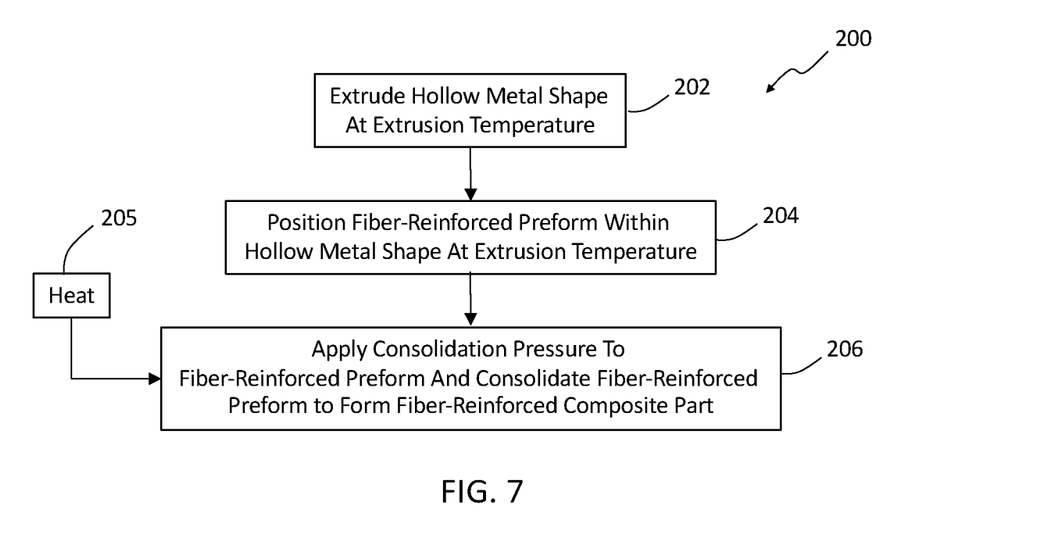
FIG. 7 schematically depicts a flow chart for a method of forming a fiber-reinforced composite part according to the teachings of the present disclosure.

Referring now to FIG. 7, a flow chart schematically depicting a method 200 for forming a fiber-reinforced composite part is shown. The method 200 includes extruding a hollow metal shape at an extrusion temperature at step 202 and positioning a fiber-reinforced preform within the hollow metal shape at the extrusion temperature at step 204. In some aspects of the present disclosure, the fiber-reinforced preform is positioned within the hollow metal shape by extruding the hollow metal shape onto the fiber-reinforced preform. In other aspects of the present disclosure, the fiber-reinforced preform is positioned within the hollow metal shape after extrusion of the hollow metal shape is complete. For example, the fiber-reinforced preform can be positioned within the hollow metal shape after the hollow metal shape has been extruded, allowed to cool, and reheated. After the fiber-reinforced preform is positioned within the hollow metal shape, consolidation pressure is applied thereto and the fiber-reinforced composite part is formed at step 206. In some instances of the present disclosure, heat 205 is applied to the fiber-reinforced preform at step 206 such that consolidated pressure and heat are used to cure the fiber-reinforced preform. As noted above, in some aspects of the present disclosure the fiber-reinforced preform is a solid fiber-reinforced preform and an inner bore may or may not be formed within the solid fiber-reinforced preform. In other aspects of the present disclosure, the fiber-reinforced preform is a hollow fiber-reinforced preform. In such aspects, the consolidation pressure can include contraction of the hollow metal shape onto the hollow fiber-reinforced preform and an outer pressure within the hollow fiber-reinforced preform.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

As used herein, the phrase at least one of A, B, and C should be construed to mean a logical (A OR B OR C), using a non-exclusive logical OR, and should not be construed to mean "at least one of A, at least one of B, and at least one of C.

What is claimed is:

1. A method of forming a fiber-reinforced composite part comprising:
    extruding a hollow metal shape at an extrusion temperature, wherein the hollow metal shape is extruded with an extrusion force;
    forming and positioning a fiber-reinforced preform within the hollow metal shape, wherein the fiber-reinforced preform is rigidly held in position with a counter-force to the extrusion force;
    extruding the hollow metal shape onto the fiber-reinforced preform while the fiber-reinforced preform is rigidly held in position; and
    cooling the hollow metal shape from the extrusion temperature to a temperature less than the extrusion temperature, wherein heat from the hollow metal shape is conducted into the fiber-reinforced preform.

2. The method of claim 1, wherein the fiber-reinforced preform is a solid fiber-reinforced preform.

3. The method of claim 2 further comprising applying a consolidation pressure onto the fiber-reinforced preform via thermal contraction of the hollow metal shape cooling from the extrusion temperature to the temperature less than the extrusion temperature.

4. The method of claim 1, wherein the fiber-reinforced preform is a hollow fiber-reinforced preform.

5. The method of claim 4 further comprising applying a consolidation pressure to the hollow fiber-reinforced preform by moving a die through the hollow fiber-reinforced preform.

6. The method of claim 5, wherein the die comprises an expandable mandrel.

7. The method of claim 5, wherein the die is drawn through the hollow fiber-reinforced preform.

8. The method of claim 5, wherein the hollow fiber-reinforced preform is extruded over the die.

9. The method of claim 1, wherein the hollow metal shape is extruded from an aluminum alloy, a copper alloy, a titanium alloy, a nickel alloy, or a magnesium alloy.

10. The method of claim 1, wherein the fiber-reinforced preform comprises carbon fibers and a polymer matrix.

11. The method of claim 10, wherein the polymer matrix is a thermoplastic polymer matrix.

12. The method of claim 11, wherein the thermoplastic polymer matrix comprises at least one of polyethylene (PE), polyethylene terephthalate (PET), polybutylene terephthalate (PBT), polycarbonate (PC), acrylonitrile butadiene styrene (ABS), polyamide (PA or nylon) and polypropylene (PP).

13. The method of claim 10, wherein the polymer matrix is a thermosetting polymer matrix.

14. The method of claim 13, wherein the thermosetting polymer matrix comprises at least one of an epoxy resin, a phenolic resin, a cyanate ester resin, a bismaleimide resin, a benzoxazine resin and a polyimide resin.

15. The method of claim 1, wherein a barrier layer is positioned between the hollow metal shape and the fiber-reinforced preform.

16. A method of forming a fiber-reinforced composite part comprising:
    extruding a hollow metal shape at an extrusion temperature and an extrusion force;
    forming and positioning a hollow fiber-reinforced preform within the hollow metal shape, wherein the fiber-reinforced preform is rigidly held in position with a counter-force to the extrusion force;
    extruding the hollow metal shape onto the fiber-reinforced preform while the fiber-reinforced preform is rigidly held in place; and
    applying consolidation pressure and heat to the hollow fiber-reinforced preform and curing the hollow fiber-reinforced preform, wherein the consolidation pressure and heat is applied to the hollow fiber-reinforced preform by thermal contraction of and heat from the hollow metal shape, respectively, cooling from the extrusion temperature to a temperature less than the extrusion temperature.

17. The method of claim 16 further comprising moving a die through the hollow fiber-reinforced preform, wherein the thermal contraction of the hollow metal shape cooling from the extrusion temperature to a temperature less than the extrusion temperature and the die moving through the hollow fiber-reinforced preform apply the consolidation pressure to the hollow fiber-reinforced preform.

18. The method of claim 16, wherein the hollow fiber-reinforced preform comprises carbon fibers and a polymer matrix.

19. A method of forming a fiber-reinforced composite part comprising:
   extruding a hollow metal shape at an extrusion temperature and an extrusion force;
   forming and positioning a fiber-reinforced preform within the hollow metal shape, wherein the fiber-reinforced preform is rigidly held in position with a counter-force to the extrusion force;
   extruding the hollow metal shape onto the fiber-reinforced preform while the fiber-reinforced preform is rigidly held in position; and
   cooling the hollow metal shape extruded onto the fiber-reinforced preform from the extrusion temperature to a temperature less than the extrusion temperature, wherein the hollow metal shape thermally contracts and provides a consolidation pressure onto the fiber-reinforced preform during the cooling of the hollow metal shape from the extrusion temperature to the temperature less than the extrusion temperature, heat from the cooling of the hollow metal shape is conducted into the fiber-reinforced preform, and the thermal contraction and heat from the cooling hollow metal shape cure the fiber-reinforced preform.

20. The method of claim 19, wherein the fiber-reinforced preform is a hollow fiber-reinforced preform and further comprising moving a die through the hollow fiber-reinforced preform such that the thermal contraction of the hollow metal shape onto the fiber-reinforced preform and the die moving through the hollow fiber-reinforced preform provide the consolidation pressure onto the hollow fiber-reinforced preform.

\* \* \* \* \*